US012771844B2

(12) United States Patent
Ahn et al.

(10) Patent No.: US 12,771,844 B2
(45) Date of Patent: Oct. 20, 2026

(54) NEURAL NETWORK-BASED VIDEO COMPRESSION METHOD USING MOTION VECTOR FIELD COMPRESSION

(71) Applicant: INTELLECTUAL DISCOVERY CO., LTD., Seoul (KR)

(72) Inventors: Yongjo Ahn, Seoul (KR); Jongseok Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 18/861,186

(22) PCT Filed: Apr. 28, 2023

(86) PCT No.: PCT/KR2023/005908

§ 371 (c)(1),
(2) Date: Oct. 28, 2024

(87) PCT Pub. No.: WO2023/211253

PCT Pub. Date: Nov. 2, 2023

(65) Prior Publication Data

US 2025/0294152 A1 Sep. 18, 2025

(30) Foreign Application Priority Data

Apr. 28, 2022 (KR) ........................ 10-2022-0053033

(51) Int. Cl.
*H04N 19/132* (2014.01)
*G06N 3/0464* (2023.01)
(Continued)

(52) U.S. Cl.
CPC ......... *H04N 19/132* (2014.11); *G06N 3/0464* (2023.01); *G06N 3/096* (2023.01); *H04N 19/172* (2014.11)

(58) Field of Classification Search
CPC .. H04N 19/132; H04N 19/172; H04N 19/105; H04N 19/137; H04N 19/176;
(Continued)

(56) References Cited

U.S. PATENT DOCUMENTS

2012/0218473 A1* 8/2012 Xu ........................ H04N 19/537 348/E5.066
2017/0308734 A1* 10/2017 Chalom ............... G06V 40/193
(Continued)

FOREIGN PATENT DOCUMENTS

EP 3553748 A1 10/2019
KR 10-2019-0043930 A 4/2019
(Continued)

OTHER PUBLICATIONS

A. Zheng, Y. Yuan, H. Zhang, H. Yang, P. Wan and O. C. Au, "Motion vector fields based video coding," 2015 IEEE International Conference on Image Processing (ICIP), Quebec City, QC, Canada, 2015, pp. 2095-2099 (Year: 2015).*
(Continued)

*Primary Examiner* — Stefan Gadomski
(74) *Attorney, Agent, or Firm* — BROADVIEW IP LAW, PC

(57) ABSTRACT

A neural network-based image processing method and apparatus, according to an embodiment of the present invention, may generate a motion vector field by using motion information used in motion prediction in processing units, included in the present picture, and generate a tensor of the motion vector field by performing compression on the motion vector field on the basis of a neural network including a plurality of neural network layers.

11 Claims, 5 Drawing Sheets

(51) Int. Cl.
*G06N 3/096* (2023.01)
*H04N 19/172* (2014.01)

(58) Field of Classification Search
CPC ...... H04N 19/52; H04N 19/70; G06N 3/0464; G06N 3/096; G06N 3/045; G06N 3/08; G06T 9/00; G06T 9/002; G06T 2207/20084
See application file for complete search history.

(56) References Cited

U.S. PATENT DOCUMENTS

| | | | | |
|---|---|---|---|---|
| 2018/0124425 | A1* | 5/2018 | Van Leuven | H04N 19/53 |
| 2020/0356827 | A1* | 11/2020 | Dinerstein | G06N 3/09 |
| 2021/0004969 | A1* | 1/2021 | Pourian | G06T 7/223 |
| 2021/0103764 | A1* | 4/2021 | Pourian | G06T 7/0002 |
| 2021/0136371 | A1* | 5/2021 | Galpin | H04N 19/52 |
| 2021/0360259 | A1* | 11/2021 | Wang | G06N 3/09 |
| 2022/0101537 | A1* | 3/2022 | Sun | G06T 3/4046 |
| 2022/0103860 | A1* | 3/2022 | Demyanov | G06N 3/0475 |
| 2022/0109807 | A1* | 4/2022 | Pohl | G06N 3/08 |
| 2022/0279203 | A1* | 9/2022 | Mangan | H04N 19/597 |
| 2022/0377358 | A1* | 11/2022 | Galpin | H04N 19/436 |
| 2022/0385907 | A1* | 12/2022 | Zhang | H04N 19/172 |
| 2023/0140006 | A1* | 5/2023 | Song | G06T 3/4007 382/300 |
| 2023/0169794 | A1* | 6/2023 | Kezele | H04N 19/51 382/103 |
| 2023/0171421 | A1* | 6/2023 | Galpin | H04N 19/577 375/240.16 |
| 2023/0300341 | A1* | 9/2023 | Wu | H04N 19/70 375/240.16 |
| 2024/0013046 | A1* | 1/2024 | Le | G06N 3/08 |
| 2024/0031611 | A1* | 1/2024 | Galpin | H04N 19/85 |
| 2024/0073411 | A1* | 2/2024 | Philippe | H04N 19/577 |
| 2024/0223762 | A1* | 7/2024 | Zhang | H04N 19/132 |

FOREIGN PATENT DOCUMENTS

| | | | |
|---|---|---|---|
| KR | 10-2020-0007250 | A | 1/2020 |
| KR | 10-2021-0088686 | A | 7/2021 |
| KR | 10-2022-0018447 | A | 2/2022 |
| WO | 2020/100988 | A1 | 5/2020 |

OTHER PUBLICATIONS

S. Y. Chang and H. -C. Wu, "Tensor Quantization: High-Dimensional Data Compression," in IEEE Transactions on Circuits and Systems for Video Technology, vol. 32, No. 8, pp. 5566-5580, 2022 (Year: 2022).*

International Search Report & Written Opinion for PCT/KR2023/005908 by Korean Intellectual Property Office dated Aug. 2, 2023.

* cited by examiner

NEURAL NETWORK-BASED VIDEO COMPRESSION METHOD USING MOTION VECTOR FIELD COMPRESSION

CROSS-REFERENCE TO RELATED APPLICATIONS

This application is a National Phase Entry Application of PCT Application No. PCT/KR2023/005908, filed on Apr. 28, 2023, which claims priority to Korean Patent Application No. 10-2022-0053033, filed on Apr. 28, 2022, in the Korean Intellectual Property Office, the entire contents of which are hereby incorporated by reference in its entirety.

TECHNICAL FIELD

The present invention relates to a method and device for compressing a motion vector field, and more particularly, to a method and device for compressing/reconstructing a motion vector field in a technology for compressing a motion vector used for temporal motion vector prediction of video coding.

BACKGROUND ART

Video images are compressed and encoded by removing spatial-temporal redundancy and inter-view redundancy, and can be transmitted through communication lines or stored in a suitable form on a storage medium.

DISCLOSURE

Technical Problem

The present invention proposes a method and device for compressing/reconstructing a motion vector field used for temporal motion vector prediction using a neural network.

Technical Solution

In order to solve the above problem, a method and device for compressing/reconstructing a motion vector field using a neural network are provided.

A neural network-based image processing method and device according to one embodiment of the present invention may generate a tensor of the motion vector field by generating a motion vector field using motion information used for motion prediction of a processing unit included in a current picture and performing compression on the motion vector field based on a neural network including a plurality of neural network layers.

In a neural network-based image processing method and device according to one embodiment of the present invention, the motion information may include at least one of a prediction direction flag, a reference index, or a motion vector.

In a neural network-based image processing method and device according to one embodiment of the present invention, the plurality of neural network layers may include at least one convolutional layer.

A neural network-based image processing method and device according to one embodiment of the present invention may spatially sample the motion vector field based on the at least one convolutional layer.

A neural network-based image processing method and device according to one embodiment of the present invention may perform normalization on the motion vector field based on a picture order count (POC) difference between a reference picture specified by a reference index of the processing unit and the current picture.

In a neural network-based image processing method and device according to one embodiment of the present invention, the tensor may be generated by performing compression on a motion vector field on which normalization has been performed.

A neural network-based image processing method and device according to one embodiment of the present invention may derive a motion vector having a unit POC difference by scaling a motion vector used for motion prediction of the processing unit by the POC difference, and may modify the motion vector field using the motion vector having the unit POC difference.

A neural network-based image processing method and device according to one embodiment of the present invention may generate a quantized tensor by performing quantization on the tensor, and store the quantized tensor in a memory.

In a neural network-based image processing method and device according to one embodiment of the present invention, the stored quantized tensor may be used for motion prediction for a processing unit in a subsequent picture of the current picture.

In a neural network-based image processing method and device according to one embodiment of the present invention, the neural network may be learned by a loss function defined based on a sum of distortion and bitrate.

In a neural network-based image processing method and device according to one embodiment of the present invention, the distortion may represent a difference between an original motion vector field and a reconstructed motion vector field.

In a neural network-based image processing method and device according to one embodiment of the present invention, the difference may be calculated using MSE (Mean Squared Error) or SAD (Sum of Absolute Difference).

In a neural network-based image processing method and device according to one embodiment of the present invention, the bit rate may be predicted using a latent tensor.

In a neural network-based image processing method and device according to one embodiment of the present invention, the bit rate may be predicted using a probability value obtained based on the neural network.

In a neural network-based image processing method and device according to one embodiment of the present invention, the loss function may be defined by additionally considering distortion between a motion vector field estimated by a teacher network and a motion vector field reconstructed by a student network.

In a neural network-based image processing method and device according to one embodiment of the present invention, the teacher network may be a flow network that predicts optical flow between a previous picture and a subsequent picture based on the current picture.

Technical Effect

The video signal coding efficiency can be improved through the motion vector field compression method and device according to the present invention.

In addition, the encoding efficiency can be improved by using the motion vector field compression method using a neural network proposed in the present invention.

In addition, since the motion vector field compression method using a neural network proposed in the present invention can perform spatial sampling together, it is possible to express motion more accurately than the existing technology that performs sampling for a specific location, and as a result, the more accurately expressed motion information can be used for subsequent temporal motion vector prediction, thereby improving the video coding efficiency.

MODE

Figure 1:
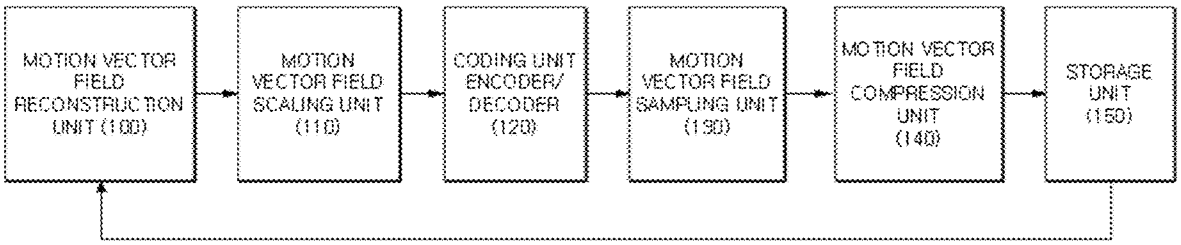
FIG. 1 illustrates an example of an encoder/decoder using motion vector field compression according to an embodiment of the present disclosure.

An embodiment of the present disclosure will be described in detail so that those skilled in the art may easily implement it by referring to a drawing attached to this specification. But, the present disclosure may be implemented in different forms and it is not limited to an embodiment described herein. And, a part irrelevant to a description is omitted to clearly describe the present disclosure in a drawing and a similar reference numeral is attached to a similar part throughout this specification.

Throughout this specification, when a part is referred to as being 'connected' to other part, it may include an electrical connection that other element presents therebetween as well as a direct connection.

In addition, when a part is referred to as 'including' a component throughout this specification, it means other component may be further included without excluding other component unless otherwise opposed.

In addition, a term such as first, second, etc. may be used to describe a variety of components, but the components should not be limited by the terms. The terms are used only to distinguish one component from other component.

In addition, for an embodiment about a device and a method described in this specification, some configurations of a device or some steps of a method may be omitted. In addition, order of some configurations of a device or some steps of a method may be changed. In addition, other configuration or other step may be inserted into some configurations of a device or some steps of a method.

In addition, some configurations or some steps of a first embodiment of the present disclosure may be added to a second embodiment of the present disclosure or may substitute some configurations or some steps of a second embodiment.

In addition, construction units shown in an embodiment of the present disclosure are independently shown to represent different characteristic functions, and they do not mean that each construction unit is configured with separated hardware or one software construction unit. In other words, each construction unit is described by being enumerated as each construction unit for convenience of a description and at least two construction units of each construction unit may be combined to form one construction unit or one construction unit may be partitioned into a plurality of construction units to perform a function. An integrated embodiment and separated embodiment of each construction unit are also included in a scope of a right of the present disclosure unless they are departing from the spirit of the present disclosure.

First, terms used in this application may be briefly described as follows.

A decoding device (Video Decoding Apparatus) to be described later may be a device included in a server terminal such as a civil security camera, a civil security system, a military security camera, a military security system, a personal computer (PC), a notebook computer, a portable multimedia player (PMP), a wireless communication terminal, a smart phone, a TV application server and a service server, etc. and it may mean a variety of devices equipped with a user terminal including equipment of every kind, a communication device including a communication modem, etc. for communication with a wired/wireless communication network, a memory for storing various kinds of programs and data for decoding an image or performing intra or inter prediction for decoding, a microprocessor for executing a program and performing operation and control and others.

In addition, an image encoded as a bitstream by an encoder may be transmitted to an image decoding device, decoded and reconstructed and reproduced as an image through a variety of communication interface such as a cable, an universal serial bus (USB), etc. or through a wired or wireless communication network, etc. such as the Internet, a wireless local area network, a wireless LAN network, a Wi-Bro network, a mobile communication network, etc. in real time or in non-real time. Alternatively, a bitstream generated by an encoder may be stored in a memory. The memory may include both a volatile memory and a non-volatile memory. In this specification, a memory may be expressed as a recoding medium storing a bitstream.

Commonly, a video may be configured with a series of pictures and each picture may be partitioned into coding units like a block. In addition, a person with ordinary skill in the art to which this embodiment pertains may understand that a term of picture entered below may be used by being substituted with other term having the same meaning as an image, a frame, etc. And, a person with ordinary skill in the art to which this embodiment pertains may understand that a term of coding unit may be used by being substituted with other term having the same meaning as a unit block, a block, etc.

Hereinafter, in reference to attached drawings, an embodiment of the present disclosure is described in more detail. In describing the present disclosure, an overlapping description is omitted for the same component.

FIG. 1 illustrates an example of an encoder/decoder using motion vector field compression according to an embodiment of the present disclosure.

According to an embodiment of the present disclosure, a motion vector field may be compressed/reconstructed and used for encoding/decoding of an image, specifically, motion estimation/compensation (or motion prediction). In the present disclosure, the motion vector field may include motion information of a previously decoded image (or a lower processing unit), and the motion vector field may also be referred to as a motion information field, a motion information list, a motion vector list, a motion information table, a motion vector table, motion information storage, motion vector storage, a motion vector set, a motion vector group, a motion information set, a motion information group, etc.

Referring to FIG. 1, an encoder/decoder using motion vector field compression may include a motion vector field reconstruction unit (100), a motion vector field scaling unit (110), a coding unit encoder/decoder (120), a motion vector field sampling unit (130), a motion vector field compression unit (140), and a storage unit (150). The present disclosure is an example, and when implementing an encoder/decoder using motion vector field compression, other components other than those illustrated in FIG. 1 may be added, and some of the components illustrated in FIG. 1 may be omitted.

Here, the coding unit may mean a encoding/decoding unit. In the present disclosure, the coding unit may be referred to as a processing unit or a processing unit. As an example, the coding unit may be one of a frame (or picture), a tile, a slice, a coding tree unit, and a coding unit (or block) of a video.

The motion vector field reconstruction unit (100) may reconstruct a motion vector field from data stored in the storage unit (150). The data stored in the storage unit (150) may include one or more pieces of motion information derived from one of the previously reconstructed pictures. The motion vector field may include motion information. In this case, the motion information may include two prediction flags (or prediction direction flags), a reference picture index (or reference index), and a compressed motion vector.

Here, one of two prediction flags may be a flag expressing inter prediction using a picture included in a reference picture list (RPL) 0, and the other may be a flag expressing inter prediction using a picture included in RPL 1. That is, when both flags are 1, it may mean bidirectional inter prediction using pictures included in RPL0 and RPL1, respectively. In addition, here, the reference picture index may mean an index of a picture used for inter prediction among the pictures included in RPL.

As an example, the compressed motion vector may be compressed and expressed with a bit depth smaller than the bit depth expressed by the original motion vector. In the present disclosure, the bit depth may also be referred to as resolution or precision. For example, if one element of the original motion vector has a value in the range of −217 to 217-1, the value of the motion vector may be expressed with a fixed-point 18 bits. In this case, the motion vector may be compressed with a fixed-point 10 bits and stored in a memory (or storage unit (150)) for temporal motion prediction during the next frame encoding/decoding. In this case, 4 bits of 10 bits may mean an exponent, and 6 bits may mean a mantissa with a sign.

The motion vector field reconstruction unit (100) may reconstruct the compressed motion vector to generate a reconstructed motion vector. For example, the motion vector field reconstruction unit (100) may reconstruct a fixed-point 10-bit expressed as an exponent and a mantissa to a fixed-point 18-bit, as in the following Equation 1.

$$mvLXCol = \text{mantissa} \ll (\text{exponent} - 1) \quad \text{[Equation 1]}$$

In Equation 1, << represents a left shift operation, mantissa is a variable representing a mantissa, and exponent is a variable representing an exponent. The motion vector field recontruction unit (100) may transfer motion information including the recontructed motion vector to the motion vector field scaling unit (110).

The motion vector field scaling unit (110) may scale motion vectors among the input motion information. According to the embodiment of the present disclosure, motion vectors used in previous pictures may have different reference pictures and thus may have different scales of motion degrees. Accordingly, the motion vector field scaling unit (110) may perform scaling according to the reference picture to make the scales of motion vectors of the motion vector field the same.

In one embodiment, each of the motion vectors reconstructed by the motion vector field reconstruction unit (100) may be scaled based on the following Equation 2.

$$tx = (\ 16384 + (\ \text{Abs}(\ td\ ) \gg 1\ )\ )/td \quad \text{[Equation 2]}$$

$$td = \text{Clip3}(\ -128,\ \ 127.\ colPocDiff\ )$$

$$tb = \text{Clip3}(\ -128,\ \ 127.\ currPocDiff\ )$$

$$distScaleFactor = \text{Clip3}(\ -4096, 4095,\ (\ tb * tx + 32\ ) \gg 6\ )$$

$$mvLXCol = \text{Clip3}(\ -131072, 131071, (distScaleFactor * mvCol + 128 - (\ distScaleFactor * mvCol >= 0\ )\ ) \gg 8\ )$$

Referring to Equation 2, the motion vector may be scaled by the scaling factor variable distScaleFactor calculated by colPocDiff and currlPocDiff. Here, mvCol is a variable representing a motion vector before scaling, and mvLXCol is a variable representing a scaled motion vector. colPocDiff is a variable representing the difference between the POC (Picture Order Count) of the reference picture (RefColPic) of the colocated picture (ColPic) and the POC of ColPic. In addition, currlPocDiff is a variable representing the difference between the POC of currPic and the POC of currRefPic when the current picture and the reference picture of the current picture are currPic and currRefPic, respectively.

Motion information including the scaled motion vector may be transmitted to a coding unit encoder/decoder (120).

The coding unit encoder/decoder (120) may perform encoding/decoding of the current coding unit using the input motion information.

For example, the input motion information may be used for inter prediction of the current coding unit. For example, in inter prediction, it may be used as a temporal motion vector prediction candidate in the merge mode. Alternatively, for example, it may be used for deriving a SbTMVP (subblock based temporal merge candidate) among the subblock merge candidates of inter prediction. Alternatively, for example, it may be used for deriving a constructed affine control point motion vector in the affine mode of inter prediction.

Motion information used for motion prediction in the coding encoder/decoder (120) may be transmitted to the motion vector field sampling unit (130).

The motion vector field sampling unit (130) may generate a spatially sampled motion vector field based on the input motion information and transmit it to the motion vector field compression unit (140). For example, the motion vectors of the motion vector field used in the coding unit encoder/decoder (120) may exist in units of 4×4 pixels. That is, the motion vector field sampling unit (130) may perform sampling in units of 4×4 pixels.

Alternatively, as an embodiment, the motion vector may be sampled in units larger than 4×4 to efficiently utilize memory. As an example, the unit sampled for the motion vector field may be predefined. For example, the motion vector field sampling unit (130) may perform sampling in units of 8×8 pixels. Alternatively, the motion vector field sampling unit (130) may perform sampling in units of 16×16 pixels. Alternatively, for example, the unit sampled for the motion vector field may be variably determined based on encoding information. In this case, the encoding information may include at least one of the size of the block, the width/height of the block, the width/height ratio of the block, the inter prediction mode, or whether it is located at the boundary of the image (or slice, tile, coding tree unit).

In addition, the location of the sample where sampling is performed may be defined as one of the upper left, upper right, lower left, lower right, and center locations of a predefined (or predetermined) unit. In this case, if sampling is performed in units of 8×8 pixels, the upper left of the 8×8 pixels may be the sampling location. Alternatively, the center of the 8×8 pixels may be the sampling location.

Figure 2:
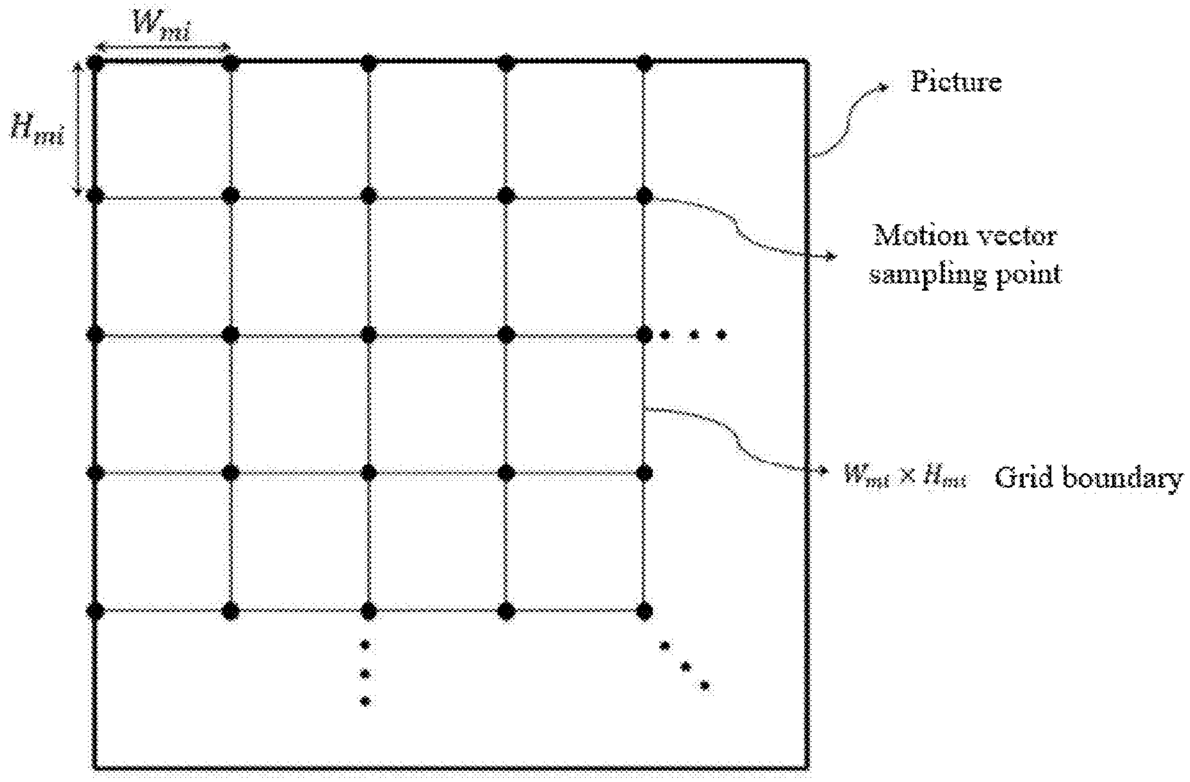
FIG. 2 is a diagram illustrating a method for sampling a motion vector field according to one embodiment of the present disclosure.

FIG. 2 is a diagram illustrating a method for sampling a motion vector field according to one embodiment of the present disclosure.

FIG. 2 shows an example of sampling at the upper left position in Wmi×Hmi pixels. As shown in FIG. 2, a motion vector at a specific position within a specific size unit may be sampled.

Again, referring to FIG. 1, motion information including a sampled motion vector field may be transmitted to a motion vector field compression unit (140). The motion vector field compression unit (140) may compress motion vectors using the motion information including the transmitted sampled motion vector field.

As mentioned above, the motion vector may be compressed into a fixed-point 10-bit number and stored in memory for temporal motion prediction when encoding/decoding the next frame. In this case, 4 bits of 10 bits may mean an exponent and 6 bits may mean a mantissa with a sign.

Motion information including a compressed motion vector field may be transmitted to a storage unit (150).

The storage unit (150) may store and manage the received motion information including a compressed motion vector field in a memory.

Figure 3:
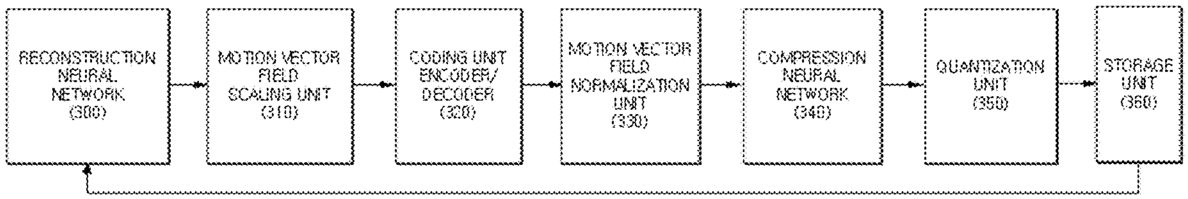
FIG. 3 illustrates an example of a coding unit encoder/decoder using the neural network-based motion vector field compression of the present disclosure.

FIG. 3 illustrates an example of a coding unit encoder/decoder using the neural network-based motion vector field compression of the present disclosure.

The present disclosure is an example, and when implementing an encoder/decoder using motion vector field compression based on neural networks, other components other than those illustrated in FIG. 3 may be added, and some of the components illustrated in FIG. 3 may be omitted.

According to an embodiment of the present disclosure, a neural network may be used for compression/reconstruction of a motion vector field. That is, referring to FIG. 3, an encoder/decoder using neural network-based motion vector field compression may include a reconstruction neural network (300), a motion vector field scaling unit (310), a coding unit encoder/decoder (320), a motion vector field normalization unit (330), a compression neural network (340), a quantization unit (350), and a storage unit (360). As an example, the embodiment described above in FIG. 1 may be equally applied to the present embodiment, and any redundant description thereof will be omitted.

As an embodiment, the neural network used in the reconstruction neural network (300) and the compression neural network (340) may include one or more neural network layers. The neural network layer may include at least one of a convolution layer, a deconvolution layer, a transposed convolution layer, a dilated convolution layer, a grouped convolution layer, a graph convolution layer, an average pooling layer, a max pooling layer, an up-sampling layer, a down-sampling layer, a pixel shuffle layer, a channel shuffle layer, a batch normalization layer, a weight normalization layer, or a generalized normalization layer.

The input/output data of each neural network layer may be transmitted in the form of a tensor, which is a three-dimensional data. As an example, the input/output data may be a feature tensor, a symbol tensor, an input tensor, an output tensor, or a feature map. In addition, the reconstruction neural network (300) and the compression neural network (340) may be the neural network that have already been learned through a learning process.

The reconstruction neural network may receive a compressed motion vector field stored in the storage unit. In this case, the compressed motion vector field may be in the form of a tensor. The compressed motion vector field may be reconstructed to a motion vector field through the reconstruction neural network. The reconstructed motion vector field may be transmitted to a motion vector field scaling unit.

The motion vector field scaling unit (310) may scale the input motion vector field.

As an example, the original motion vector field compressed by the compression neural network (340) may be a motion vector field having a unit POC difference with POC difference of 1. Accordingly, scaling may be required by the amount of the POC difference between the current POC and the POC of the reference picture.

For example, each motion vector may be scaled by the distScaleFactor calculated by currlPocDiff as in Equation 3 below.

$$distScaleFactor = \text{Clip3}(-128,\ 127.currPocDiff) \qquad \text{[Equation 3]}$$

$$mvLXCol = \text{Clip3}(\ -131072,\ 131071,\ (distScaleFactor * mvCol - (\ distScaleFactor * mvCol >= 0)\ ))$$

Here, mvCol is a variable representing a motion vector before scaling, and mvLXCol is a variable representing a scaled motion vector. currlPocDiff may mean the difference between the POC of currPic and the POC of currRefPic, when the current picture and the reference picture of the current picture are currPic and currRefPic, respectively.

Motion information including the scaled motion vector may be transmitted to the coding unit encoder/decoder (320).

The coding unit encoder/decoder (320) may perform encoding/decoding operation of the current coding unit using input motion information.

For example, the input motion information may be used for inter prediction of the current coding unit. In the inter prediction, it may be used as a temporal motion vector prediction candidate in the merge mode. Alternatively, as an example, it may be used for deriving a subblock based temporal merge candidate (SbTMVP) among the subblock merge candidates of the inter prediction. Alternatively, as an example, it may be used for deriving a constructed affine control point motion vector in the affine mode of the inter prediction.

Motion information including the motion vector field used in the coding unit encoder/decoder (320) may be transmitted to the motion vector field normalization unit (330).

The motion vector field normalization unit (330) may normalize the motion vector field using motion information including the input motion vector field and transmit the normalized motion vector field to the compression neural network (340).

According to one embodiment of the present disclosure, motion vectors of an input motion vector field may refer to different reference pictures. Accordingly, the scales of the motion vectors may be different from each other, and data with spatially different scales cannot be processed by a neural network, so normalization that makes the scales of all motion vectors of the motion vector field the same is required. In this case, the motion vectors may be scaled based on a POC difference of 1, as in the following Equation 4. In other words, the motion vector field normalization unit (330) may scale the motion vector included in the motion vector field so that it has a unit POC difference with POC difference of 1.

$$td = \text{Clip3}(\ -128,\ 127,\ currPocDiff\ ) \qquad \text{[Equation 4]}$$

$$tx = (\ 16384 + (\ \text{Abs}(\ td\ ) \gg 1\ )\ )/td$$

$$distScaleFactor = \text{Clip3}(\ -4096,\ 4095,\ (\ tx + 32\ ) \gg 6\ )$$

$$mvLXCol = \text{Clip3}(\ -131072,\ 131071.\ (distScaleFactor * mvCol + 128 - (\ distScaleFactor * mvCol >= 0\ )\ ) \gg 8\ )$$

The compression neural network (340) may generate a compressed tensor by performing compression on the input normalized motion vector field using multiple neural network layers. As an example, the tensor compressed by the compression neural network (340) may have a lower spatial resolution than the input motion vector field.

Since the compression neural network (340) may perform spatial sampling together using a convolution filter (or convolution layer), it may express motion more accurately than the existing technology that performs sampling for a specific location. As a result, the video encoding efficiency may be improved by using the motion information expressed more accurately for the subsequent temporal motion vector prediction. The compressed tensor may be transmitted to the quantization unit (350).

The quantization unit (350) may quantize the input compressed tensor to generate a quantized tensor. The quantized tensor may be transmitted to the storage unit (360).

The storage unit (360) may store the received quantized tensor in memory for encoding/decoding of subsequent frames.

Figure 4:
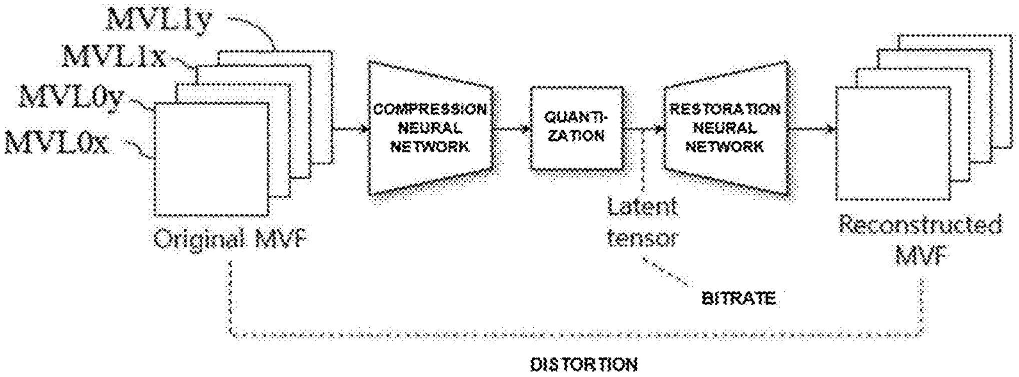
FIG. 4 illustrates an example of a conceptual diagram for compression and reconstruction neural network learning according to one embodiment of the present disclosure.

FIG. 4 illustrates an example of a conceptual diagram for compression and reconstruction neural network learning according to one embodiment of the present disclosure.

Referring to FIG. 4, the original motion vector field (Original MVF in FIG. 4) may be input to the compression neural network by merging the motion vector fields for two prediction directions into the channel axis as illustrated in FIG. 4. As an example, the compression neural network and the reconstruction neural network of FIG. 4 may be the compression neural network (340) and the reconstruction neural network (300) of FIG. 3, respectively. In FIG. 4, MVF means a motion vector field, and each MVF may be a motion vector field for L0 and L1. In addition, as an example, each MVF may be a motion vector field normalized to a unit POC difference through motion information.

As an example, the quantization in FIG. 4 may mean a general ROUND operation. Alternatively, it may be quantization performed by a specific quantization parameter.

The motion vector field reconstructed from the reconstruction neural network may have the same spatial resolution and number of channels as the original motion vector field.

In addition, as an example, a sum of distortion and bitrate may be used as a loss function for training a compression neural network and a reconstruction neural network. As an example, a loss function may be defined as in the following Equation 5.

$$\text{Loss} = \text{Bitrate} + \lambda \times \text{Distortion} \qquad \text{[Equation 5]}$$

Here, the distortion may be derived as the difference between the original motion vector field and the reconstructed motion vector field. As an example, the Mean Squared Error (MSE) or the Sum of Absolute Difference (SAD) may be used to calculate the difference between the original motion vector field and the reconstructed motion vector field.

In addition, as an example, since it is difficult to measure the actual bit generation amount, the bit rate may be predicted using a latent tensor. In this case, the predicted value of the bit rate may be an entropy using a distribution of values. Alternatively, it may be a predicted value based on a probability value obtained through a neural network.

As described above, the reconstructed motion vector field may be used for temporal motion vector prediction. Therefore, a motion vector that expresses motion more accurately than the existing motion vector field may be generated using a neural network.

In addition, according to one embodiment of the present disclosure, a compression neural network and a reconstruction neural network may be trained using a knowledge distillation-based learning method for more accurate motion expression.

Knowledge distillation is a learning method that performs network learning by using the results of a previously learned network that performs the same task as the network to be learned. Knowledge distillation may be used when the network to be learned is relatively small or when learning on new data is required. Knowledge distillation may be used by adding the sum of the differences between the results obtained from the previously learned network and the results obtained from the network in learning to the loss function along with the loss function used previously.

Figure 5:
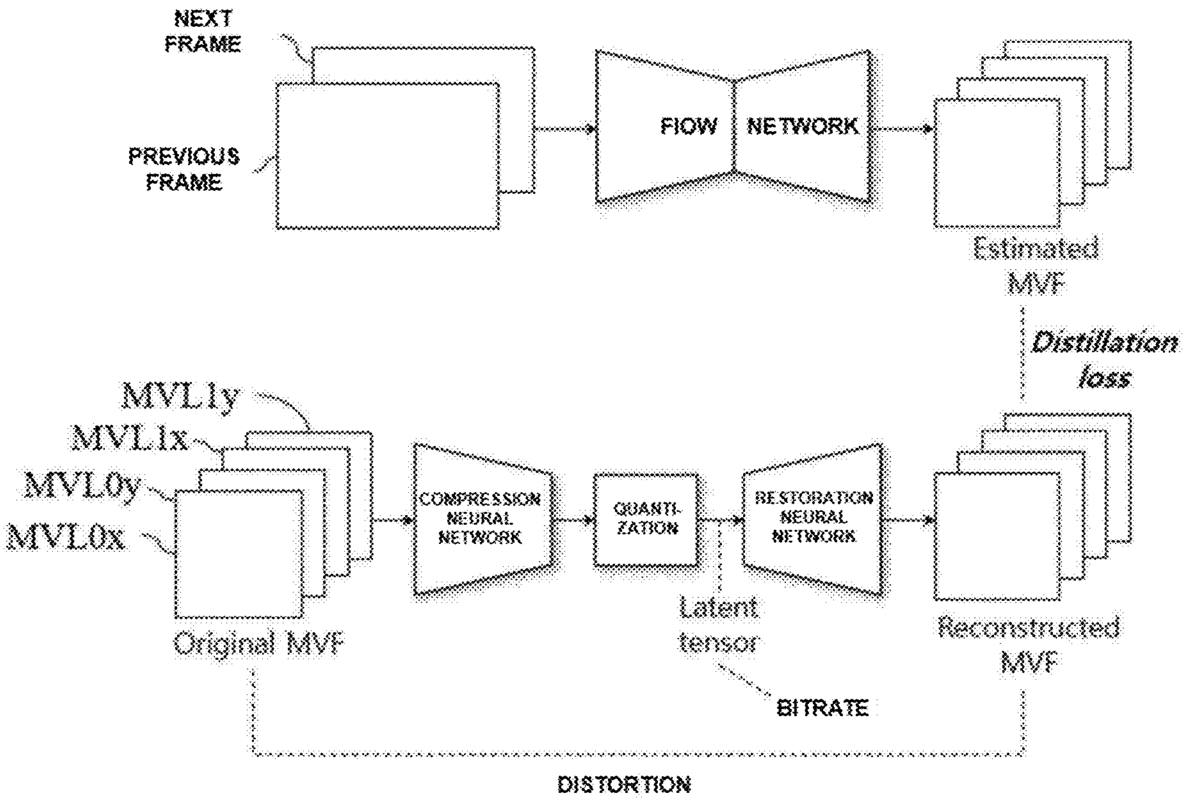
FIG. 5 illustrates a conceptual diagram for the compression and reconstruction neural network learning using knowledge distillation according to one embodiment of the present disclosure.

FIG. 5 illustrates a conceptual diagram for the compression and reconstruction neural network learning using knowledge distillation according to one embodiment of the present disclosure.

Referring to FIG. 5, the compression and reconstruction neural network may be trained through knowledge distillation-based learning to train the neural network so that the reconstructed motion vector field may express more accurate movements. In this case, the already trained network may be referred to as a teacher network, and the compression and reconstruction neural network may be referred to as a student network.

In one embodiment, the teacher network may be a flow network (or optical flow network), which is one of the neural networks that predicts optical flow. The flow network may take two images as input and predict the movement between them. The two images may be the previous and next frames of the current frame.

That is, optical flow may be predicted by inputting the preceding/following frames of the current frame into the flow network. By changing the optical flow into a form similar to the motion vector field, the distortion with respect to the reconstructed motion vector field may be measured. The measured distortion may be used as distillation loss. In this case, MSE, SAD, etc. may be used to calculate the distortion. As an example, a loss function may be defined as in the following Equation 6.

$$\text{Loss} = \text{Bitrate} + \lambda \times \text{Distortion} + \text{Distillation loss} \quad \text{[Equation 6]}$$

Referring to Equation 6, the loss may be defined by using the same distortion and bit rate as previously used and additionally adding a distillation loss, and the compression and reconstruction neural network may be trained so that the loss is minimized. As an example, the training may be repeated a predefined number of times, or the training may be repeated so that the loss is lowered below a predefined threshold.

In other words, the compression neural network may be trained based on the above-described flow network, and the motion vector (or motion information) used for temporal/spatial prediction may be compressed and stored using the trained compression neural network. Alternatively, the reconstruction neural network may be trained based on the above-described flow network, and the motion vector (or motion information) used for temporal/spatial prediction may be reconstructed using the trained reconstruction neural network.

Figure 6:
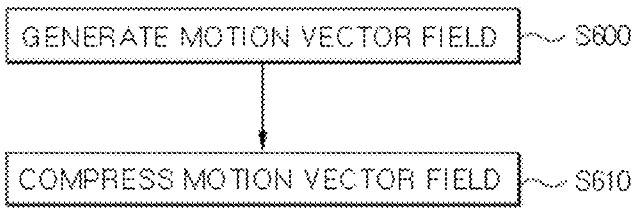
FIG. 6 is a flowchart illustrating a neural network-based motion vector field compression method according to one embodiment of the present disclosure.

FIG. 6 is a flowchart illustrating a neural network-based motion vector field compression method according to one embodiment of the present disclosure.

The embodiments described above in FIGS. 1 to 5 may be applied equally to the motion vector field compression process according to the present disclosure. Duplicate descriptions in this regard are omitted.

Referring to FIG. 6, a motion vector field may be generated using motion information used for motion prediction of a processing unit included in a current picture (S600). Here, the motion information may include at least one of a prediction direction flag, a reference index, or a motion vector. The processing unit may be the coding unit described above.

A tensor of a motion vector field may be generated by performing compression on the motion vector field based on a neural network including a plurality of neural network layers (S610). In this case, as an example, the plurality of neural network layers may include at least one convolutional layer.

Additionally, as described above, the motion vector field may be spatially sampled based on at least one convolutional layer.

As described above, as an example, based on a POC (picture order count) difference between a reference picture specified by a reference index of the processing unit and the current picture, normalization may be performed on the motion vector field. In this case, a tensor may be generated by performing compression on the motion vector field on which the normalization has been performed. In addition, the above-described normalization may be performed by deriving a motion vector having a unit POC difference by scaling a motion vector used for motion prediction of the processing unit by the POC difference, and modifying the motion vector field by using the motion vector having the unit POC difference.

As described above, as an example, a quantized tensor may be generated by performing quantization on the tensor, and the generated quantized tensor may be stored in memory. In this case, the stored quantized tensor may be used for motion prediction for a processing unit in a subsequent picture of the current picture.

As described above, as an example, the neural network may be trained by a loss function defined based on a sum of distortion and bitrate. In this case, the distortion may represent a difference between an original motion vector field and a reconstructed motion vector field. And, the difference may be calculated using MSE (Mean Squared Error) or SAD (Sum of Absolute Difference). In addition, as an example, the bitrate may be predicted using a tensor of a motion vector field generated in step S610. Alternatively, the bitrate may be predicted using a latent tensor. Alternatively, the bitrate may be predicted using a probability value obtained based on the neural network.

As described above, as an example, the loss function may be defined by additionally considering the distortion between the motion vector field estimated by the teacher network and the motion vector field reconstructed by the student network. In this case, the teacher network may be a flow network that predicts the optical flow between the previous picture and the next picture based on the current picture.

Figure 7:
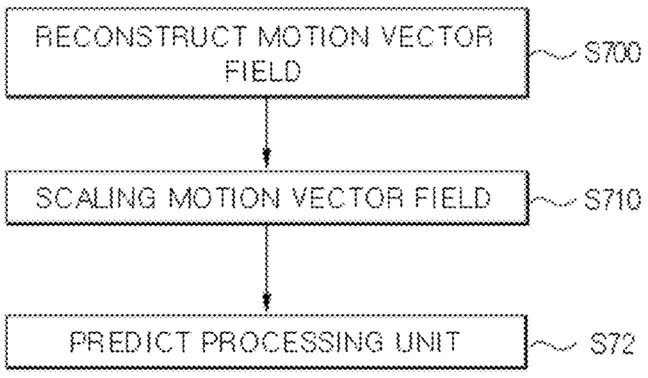
FIG. 7 is a flowchart illustrating a neural network-based motion vector field reconstruction and motion prediction method according to one embodiment of the present disclosure.

FIG. 7 is a flowchart illustrating a neural network-based motion vector field reconstruction and motion prediction method according to one embodiment of the present disclosure.

The embodiments described above in FIGS. 1 to 6 may be substantially identically applied to the motion vector field reconstruction and motion prediction processes according to the present disclosure. That is, the motion vector field reconstruction may be a process corresponding to the motion vector field compression. Duplicate descriptions in this regard will be omitted.

The motion vector field compressed and stored in the memory may be reconstructed for motion prediction (S700). In this case, the reconstruction neural network described in FIGS. 3 to 5 may be used prior to the motion vector field reconstruction.

And, the reconstructed motion vector field may be scaled (S710). As described above, the motion vectors used in the previous picture may have different reference pictures and thus the scale of the motion degree may be different. Therefore, scaling may be performed according to the reference picture to make the scale of the motion vectors in the motion vector field the same.

Additionally, the reconstructed motion vector field may be a motion vector field having a unit POC difference with POC difference of 1. Accordingly, scaling may be performed as much as the POC difference between the current POC and the POC of the reference picture.

Encoding/decoding for the current processing unit may be performed using the scaled motion vector field (S720). In other words, motion prediction for the current processing unit may be performed using the motion vector field.

For example, the input motion information may be used for inter prediction of the current coding unit. In the inter prediction, it may be used as a temporal motion vector prediction candidate in the merge mode. Alternatively, as an example, it may be used for deriving a subblock based temporal merge candidate (SbTMVP) among the subblock merge candidates of the inter prediction. Alternatively, as an example, it may be used for deriving a constructed affine control point motion vector in the affine mode of the inter prediction.

Embodiments described above may be a combination of components and features of the present disclosure in a predetermined form. Each component or feature should be considered selective unless explicitly stated otherwise. Each component or feature may be implemented in a form which is not combined with other component or feature. In addition, some components and/or features may be combined to configure an embodiment of the present disclosure. Order of operations described in embodiments of the present disclosure may be changed. Some configurations or features of an embodiment may be included in other embodiment or may be replaced with a configuration or a feature corresponding to other embodiment. It is obvious that claims without an explicit citation relationship in a scope of claims may be combined to configure an embodiment or may be included as a new claim by amendment after application.

An embodiment according to the present disclosure may be implemented by a variety of means, for example, hardware, firmware, software, or a combination thereof, etc. For implementation by hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

In addition, for implementation by firmware or software, an embodiment of the present disclosure may be implemented in a form of a module, a procedure, a function, etc. performing functions or operations described above and may be recorded in a readable recoding medium through a variety of computer means. Here, a recording medium may include a program instruction, a data file, a data structure, etc. alone or in combination. A program instruction recorded in a recording medium may be those specially designed and configured for the present disclosure or those available by being notified to a person skilled in computer software. For example, a recording medium includes magnetic media such as a hard disk, a floppy disk and a magnetic tape, optical media such as CD-ROM (Compact Disk Read Only Memory) and DVD (Digital Video Disk), magneto-optical media such as a floptical disk and a hardware device which is specially configured to store and perform a program instruction such as ROM, RAM, a flash memory, etc. An example of a program instruction may include a high-level language code which may be executed by a computer by using an interpreter, etc. as well as a machine language code like what is made by a compiler. Such a hardware device may be configured to operate as at least one software module to perform an operation of the present disclosure and vice versa.

In addition, a device or a terminal according to the present disclosure may be driven by a command which causes at least one processor to perform functions and processes described above. For example, such a command may include, for example, an interpreted command like a script command such as a JavaScript or ECMAScript command, etc. or other commands stored in a computer readable medium readable or an executable code. Further, a device according to the present disclosure may be implemented in a distributed way across a network such as Server Farm or may be implemented in a single computer device.

In addition, a computer program which comes with a device according to the present disclosure and executes a method according to the present disclosure (also known as a program, software, a software application, a script or a code) may be written in any form of a programming language including a compiled or interpreted language or a priori or procedural language and may be deployed in any form including a stand-alone program, module, component or subroutine or other units suitable for use in a computer environment. A computer program does not necessarily correspond to a file of a file system. A program may be stored in a single file provided for a requested program, or in multiple interacting files (e.g., a file storing part of at least one module, subprogram or code), or in part of a file owning other program or data (e.g., at least one script stored in a markup language document). A computer program may be positioned in one site or distributed across a plurality of sites and may be deployed to be executed on one computer or multiple computers interconnected by a communication network.

It is obvious to a person skilled in the art that the present disclosure may be implemented in other specific form without departing from an essential feature of the present disclosure. Accordingly, the above-described detailed description should not be interpreted restrictively in all respects and should be considered illustrative. A scope of the present disclosure should be determined by reasonable interpretation of attached claims and all changes within an equivalent scope of the present disclosure are included in a scope of the present disclosure.

The invention claimed is:

1. A neural network-based image processing method, comprising:

generating a motion vector field using motion information used for motion prediction of a processing unit included in a current picture, the motion information including at least one of a prediction direction flag, a reference index, or a motion vector;

generating a tensor of the motion vector field by performing compression on the motion vector field based on a neural network including a plurality of neural network layers;

generating a quantized tensor by performing quantization on the tensor; and storing the quantized tensor in a memory, wherein the stored quantized tensor is used for motion prediction for a processing unit in a subsequent picture of the current picture.

2. The method of claim 1, wherein the plurality of neural network layers includes at least one convolutional layer.

3. The method of claim 2, wherein performing the compression on the motion vector field comprises:

spatially sampling the motion vector field based on the at least one convolutional layer.

4. The method of claim 1, further comprising:

performing normalization on the motion vector field based on a picture order count (POC) difference between a reference picture specified by a reference index of the processing unit and the current picture.

5. The method of claim 4, wherein performing the normalization comprises:

deriving a motion vector having a unit POC difference by scaling a motion vector used for motion prediction of the processing unit by the POC difference; and modifying the motion vector field using the motion vector having the unit POC difference.

6. The method of claim 1, wherein the neural network is learned by a loss function defined based on a sum of distortion and bitrate, wherein the distortion represents a difference between an original motion vector field and a reconstructed motion vector field, and wherein the difference is calculated using MSE (Mean Squared Error) or SAD (Sum of Absolute Difference).

7. The method of claim 6, wherein the bitrate is predicted using a latent tensor.

8. The method of claim 6, wherein the bitrate is predicted using a probability value obtained based on the neural network.

9. The method of claim 6, wherein the loss function is defined by additionally considering distortion between a motion vector field estimated by a teacher network and a motion vector field reconstructed by a student network.

10. The method of claim 9, wherein the teacher network is a flow network that predicts optical flow between a previous picture and a subsequent picture based on the current picture.

11. A neural network-based image processing device, comprising:

a processor controlling the image processing device; and a memory coupled with the processor and storing data, wherein the processor is configured to:

generate a motion vector field using motion information used for motion prediction of a processing unit included in a current picture, the motion information including at least one of a prediction direction flag, a reference index, or a motion vector, generate a tensor of the motion vector field by performing compression on the motion vector field based on a neural network including a plurality of neural network layers;

generate a quantized tensor by performing quantization on the tensor, wherein the memory is configured to store the quantized tensor, and wherein the stored quantized tensor is used for motion prediction for a processing unit in a subsequent picture of the current picture.

* * * * *